United States Patent
Ball (10) Patent No.: US 8,135,894 B1
(45) Date of Patent: Mar. 13, 2012

(54) METHODS AND SYSTEMS FOR REDUCING INTERRUPT LATENCY BY USING A DEDICATED BIT

(75) Inventor: James L. Ball, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 76 days.

(21) Appl. No.: 12/533,980

(22) Filed: Jul. 31, 2009

(51) Int. Cl.
*G06F 13/26* (2006.01)

(52) U.S. Cl. .................. 710/264; 710/265; 710/269

(58) Field of Classification Search .......... 710/260–269; 712/244

See application file for complete search history.

(56) References Cited

U.S. PATENT DOCUMENTS

| | | | |
|---|---|---|---|
| 5,325,487 A | 6/1994 | Au et al. | |
| 5,568,380 A | 10/1996 | Brodnax et al. | |
| 5,568,644 A | 10/1996 | Nelson et al. | |
| 5,642,516 A * | 6/1997 | Hedayat et al. | 710/260 |
| 5,887,169 A | 3/1999 | Lacombe | |
| 6,243,804 B1 * | 6/2001 | Cheng | 712/228 |
| 6,631,394 B1 | 10/2003 | Rönkkä et al. | |
| 6,799,269 B2 * | 9/2004 | Dowling | 712/244 |
| 6,845,419 B1 * | 1/2005 | Moyer | 710/264 |
| 6,917,997 B2 * | 7/2005 | Bhagat | 710/261 |
| 6,920,516 B2 * | 7/2005 | Hartwell et al. | 710/263 |
| 6,981,083 B2 * | 12/2005 | Arimilli et al. | 710/260 |
| 7,093,144 B2 | 8/2006 | Skroch | |
| 7,155,704 B2 | 12/2006 | Williams | |
| 7,225,285 B1 | 5/2007 | Fairman et al. | |
| 7,426,728 B2 * | 9/2008 | Ruemmler et al. | 718/100 |
| 7,487,339 B2 * | 2/2009 | Uhler | 712/228 |
| 7,739,438 B2 * | 6/2010 | Zilavy | 710/269 |
| 7,793,025 B2 * | 9/2010 | Ehrlich et al. | 710/264 |
| 7,836,291 B2 * | 11/2010 | Yim et al. | 712/244 |
| 2003/0028696 A1 * | 2/2003 | Catherwood et al. | 710/260 |
| 2007/0186085 A1 * | 8/2007 | Yim et al. | 712/244 |

* cited by examiner

*Primary Examiner* — Raymond Phan
(74) *Attorney, Agent, or Firm* — Weaver Austin Villeneuve & Sampson LLP (57) ABSTRACT

A system and a method for reducing interrupt latency is described. The system includes a first interrupt source configured to generate a first interrupt, a second interrupt source configured to generate a second interrupt, and a processor. The processor includes a shadow set that stores data used to service the first interrupt. The processor receives the second interrupt and receives a designation of the shadow set to service the second interrupt. The processor determines, based on a dedicated bit, whether the shadow set is used to service the first interrupt upon receiving the second interrupt.

23 Claims, 8 Drawing Sheets

SSTATUS Register

| 31 | 30 | 29 | 28 | 27 | 26 | 25 | 24 | 23 | 22 | 21 | 20 | 19 | 18 | 17 | 16 | 15 14 13 12 11 | 10 9 8 7 6 5 4 | 3 | 2 | 1 | 0 |
|---|---|---|---|---|---|---|---|---|---|---|---|---|---|---|---|---|---|---|---|---|---|
| SR S | | | | | | | | | | | | | | RS IE | NM I | RS[N-1:0] | IL | IH | EH | U | PIE |

METHODS AND SYSTEMS FOR REDUCING INTERRUPT LATENCY BY USING A DEDICATED BIT

FIELD OF THE INVENTION

The present disclosure generally relates to interrupt latency and more particularly to systems and methods for reducing interrupt latency.

BACKGROUND

Interrupt latency includes a number of clock cycles between an assertion of an interrupt by an interrupt source and execution of an initial non-prologue instruction in an interrupt service routine (ISR). The interrupt latency includes a cause latency, a selection latency, and a funnel latency. The cause latency is a number of cycles for a processor to determine that an interrupt is a reason to arrive at an address of an initial instruction of the ISR. The selection latency is a number of clock cycles for the processor to choose among multiple interrupts. The funnel latency includes a number of clock cycles in an interrupt funnel. The funnel latency includes a context overhead, a real-time operating system (RTOS) overhead, and a call overhead. The context overhead includes a number of clock cycles to save a state, such as data within a register file, before calling the ISR. The RTOS overhead includes a number of clock cycles for the processor to inform the RTOS that the ISR is entered into and exited from. The call overhead includes a number of clock cycles executed to obtain an address of the ISR and to prepare function arguments for calling the ISR.

An interrupt handler saves a portion of the register file of the processor to a bulk memory before executing the ISR. The time used to save the portion of the register file to the bulk memory is counted against the processor's interrupt latency. The time used to save the portion of the register file can be significant. For many real-time systems, such as, Bosch® Automotive Antilock Braking System (ABS) brake-system controller, the worst-case interrupt-latency matters. When saving the portion of the register file to the bulk memory, the worst-case interrupt latency can be high. For example, for the Nios II processor architecture, the worst-case interrupt latency for many real systems can be hundreds of processor clock cycles.

SUMMARY OF THE INVENTION

In one aspect, a system for reducing interrupt latency is described. The system includes a first interrupt source configured to generate a first interrupt, a second interrupt source configured to generate a second interrupt, and a processor. The processor includes a register file, which further includes a normal set and one or more shadow sets. The shadow set stores data used to service the first interrupt. The processor receives the second interrupt and receives a designation of the shadow set to service the second interrupt. The processor determines, based on a dedicated bit, whether the shadow set is used to service the first interrupt upon receiving the second interrupt.

Processor also includes an SSTATUS register including a switched register set (SRS) field and a comparator. The dedicated bit is the SRS field of the SSTATUS register. The dedicated bit is set to 1 by the comparator upon determining that the shadow set is not in use preceding to a use for an external interrupt and the dedicated bit is set to 0 by the comparator upon determining that the shadow set is in use preceding to the use for the external interrupt. The dedicated bit is set to 1 by the comparator if taking the external interrupt causes the processor to switch to a shadow set that is not in use. By reading the SRS field in a single instruction cycle, the processor determines whether or not to save a portion of the shadow set. This reading of the SRS field reduces interrupt latency because the additional overhead of reading the SRS field is minimal and saves a lengthy operation of saving context.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION

Figure 1:
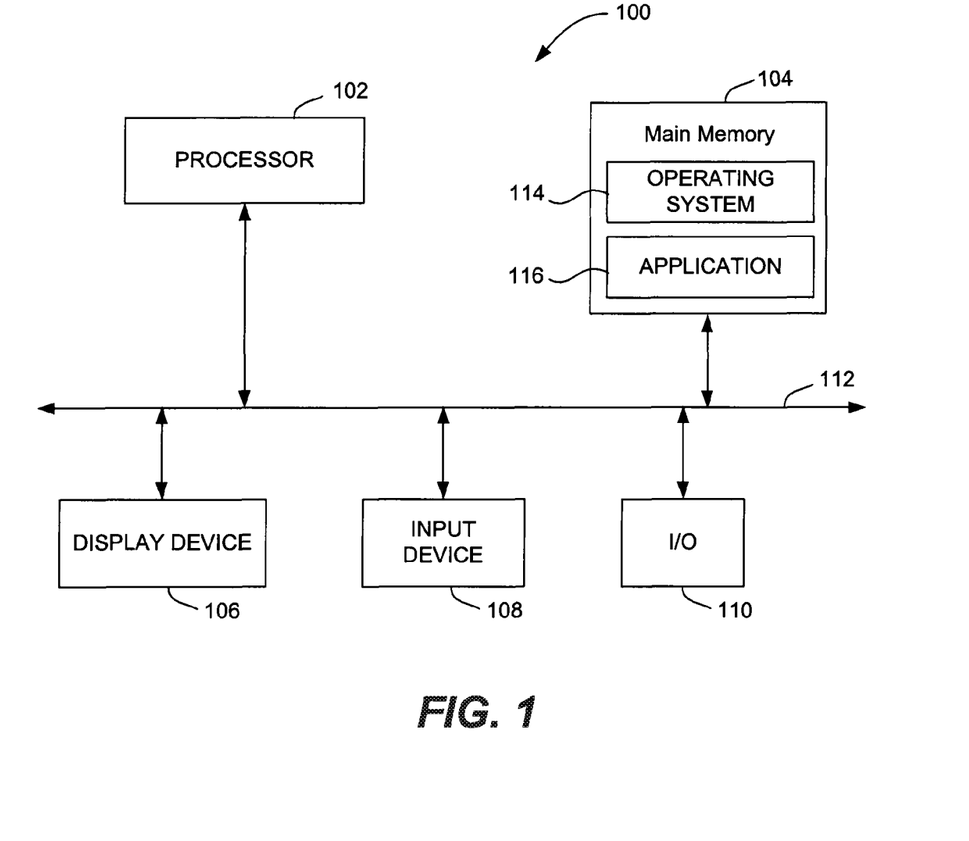
FIG. 1 is a block diagram of an embodiment of a system for reducing interrupt latency.

FIG. 1 is a block diagram of an embodiment of a system 100 for reducing interrupt latency. System 100 includes a processor 102, a main memory 104, a display device 106, and input device 108, and an input/output (I/O) interface 110. Processor 102, main memory 104, display device 106, input device 108, and I/O interface 110 are connected via a bus 112, which includes a data bus, a control bus, and an address bus. Input device 108 may be a touch screen, a keyboard, a mouse, or a stylus. Examples of display device 106 include a cathode ray tube (CRT), a liquid crystal display (LCD), a plasma display, or a light emitting diode (LED) display used to display information to a user. Processor 102 is a microprocessor, a central processing unit (CPU), or a part of a microcontroller. I/O interface 110 connects processor 102 to a peripheral device, such as a modem, a network interface card (NIC), a printer, or a scanner.

Main memory 104 includes a random access memory (RAM) or a combination of the RAM and a read-only memory (ROM). For example, main memory 104 is double data rate synchronous dynamic RAM (DDR SDRAM). Main memory 104 is used to store an operating system 114, such as a real time operating system (RTOS), executed by processor 102. Main memory 104 further stores a set of application programs 116 that are also executed by processor 102. Examples of the application programs 116 include Microsoft® Word, Microsoft® Outlook, and Corel WordPerfect®.

Figure 2:
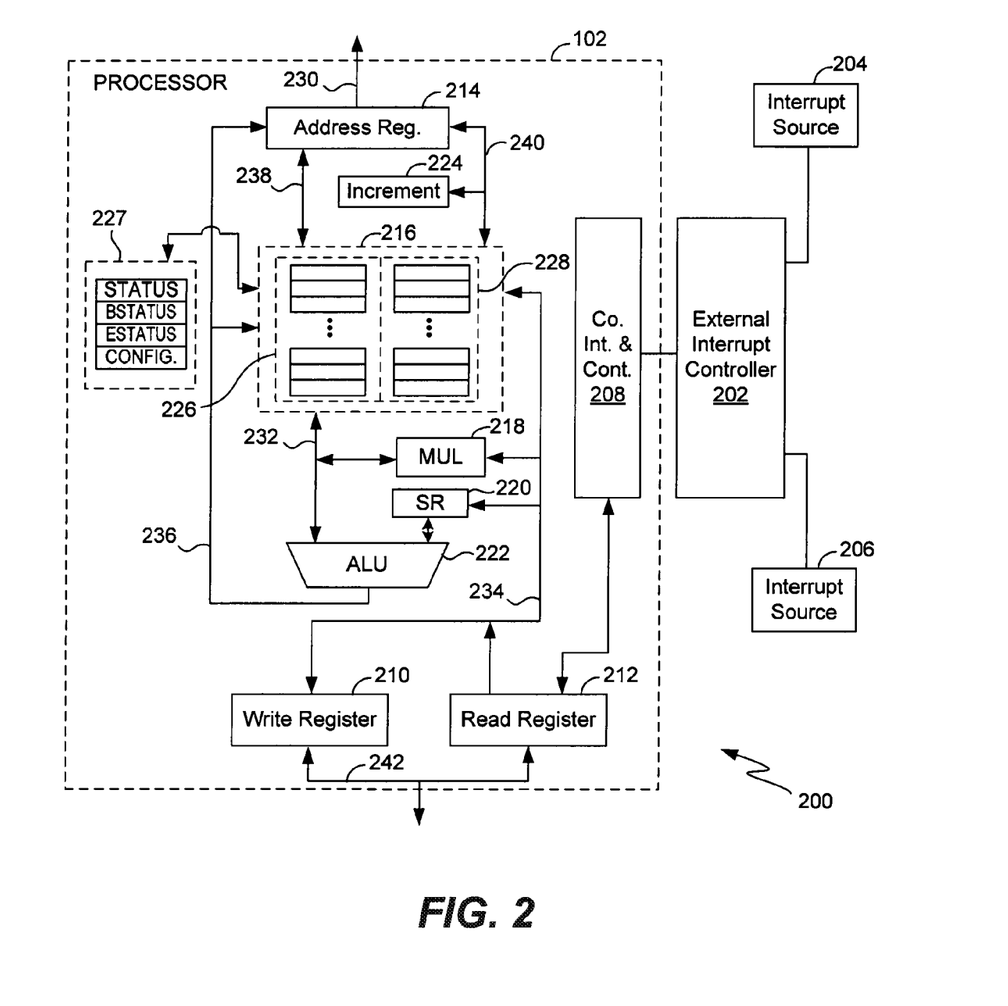
FIG. 2 is a block diagram of another embodiment of a system for reducing interrupt latency.

FIG. 2 is a block diagram of an embodiment of a system 200 for reducing interrupt latency. System 200 includes an external interrupt controller (EIC) 202, a first interrupt source 204, a second interrupt source 206, and processor 102. Processor 102 includes a command interpreter and control block 208, a write register 210, a read register 212, an address register 214, a register file that has a plurality of register files 216, a multiplier 218, a barrel shifter 220, an arithmetic logic unit (ALU) 222, and an address counter 224. Register file 216 includes a normal set 226 and one or more shadow sets, such as a shadow set 228. An example of a register file includes a general purpose register file, which is used by a plurality of instructions for a general-purpose use.

A register file includes any number of registers, such as 5 registers, 32 registers, or 64 registers. For example, normal set 226 includes 32 registers and shadow set 228 includes an additional 32 registers. A register may be a Z-bit register, where Z is an integer.

Processor 102 includes a portion of an address bus 230 of bus 112 (FIG. 1), a first internal data bus (A bus) 232, a second internal data bus (B bus) 234, a third internal data bus (ALU bus) 236, an inner address bus 238, and an address changing bus 240. Examples of each of first interrupt source 204 and second interrupt source 206 include main memory 104, display device 106, input device 108, I/O interface 110, and the peripheral device. EIC 202 includes a processor and a memory, such as a RAM, a plurality of registers, and a ROM. Command interpreter and control block 208 may be an application specific integrated circuit (ASIC) or a programmable logic device (PLD) that is configured to perform the functions described herein as performed by the block.

Processor 102 further includes a set 227 of control registers including a STATUS register, a BSTATUS register, an ESTATUS register, and a configuration (CONFIG.) register that are located outside register file 216.

In view of an operation of processor 102, command interpreter and control block 208 interprets a plurality of program commands of a program code to react to a plurality of interrupt requests, such as interrupts, from first interrupt source 204 and/or second interrupt source 206 to form a set of control signals for reading data and for writing data between main memory 104 and processor 102, and to control a formation of address data used for address bus 230. The program commands include the plurality of instructions received from operating system 114.

Read register 212 of a data bus 242 of bus 112 (FIG. 1) positions the program commands coming from the data bus 242 to an internal command queue (not shown) of the read register 212 and data received from the data bus 242 to a data register (not shown). Command interpreter and control block 208 reads in the internal command queue a program command to be carried out next and interprets the command. If useful, command interpreter and control block 208 reads data from the data register (not shown) and transfers the data to second internal data bus 234, wherefrom the data is transferred via barrel shifter 220 to ALU 222, whereto first internal data bus 232 is directed. In a corresponding manner, command interpreter and control block 208 controls writing of data to write register 210, wherefrom the data can be transferred to data bus 242 of bus 112 (FIG. 1).

In ALU 222, summations, subtractions, and logic operations are executed. From ALU 222, data is transferred along third internal data bus 236 to address register 214 and to register file 216. Register file 216 includes a plurality of registers for storing data, a plurality of status registers and a program counter (PC) used for pointing to the program commands stored in main memory 104. For this purpose, inner address bus 238 is directed from register file 216 to address register 214.

Address register 214 is connected to address counter 224, where a value of the PC is added by an integer n, such as one or four, to point to the immediate next instruction in the program commands. In some situations, one of the program commands, such as a sub-program request or an interrupt request, that is carried out causes a transfer to another location in the program code, where command interpreter and control block 208 sets this address to the program counter and transfers the address to address register 214. From address counter 224, address changing bus 240 is directed to address register 214 and to register file 216.

Multiplier 218 carries out multiplications and/or divisions. Multiplier 218 is connected to the first internal data bus 232 and second internal data bus 234. One part of data registers in register file 216 can be used in all the operating modes of processor 102, and further, for different operating modes another part of the data registers are reserved for use in a few of operating modes and blocked from using the remaining operating modes. Further, for different operating modes, a specific stack pointer (SP) is provided in register file 216 and a stack register that the SP points to is also provided in register file 216. Processor 102 can be set to at least two operating modes including a user mode in which the use of a plurality of resources, such as registers within register file 216, of processor 102, is restricted or not allowed and a privileged mode, where all the resources of processor 102 can be used. During the user mode, processor 102 usually does not allow access to certain functions, such as related to security, that processor 102 allows during the privileged mode. A device driver of operating system 114 carries out a plurality of initial settings of a plurality of system devices, such as, processor 102, main memory 104, display device 106, input device 108, I/O interface 110, and the peripheral device.

Shadow set 228 reduces an amount of time used to respond to an interrupt. Shadow set 228 reduces interrupt latency by allowing operating system 114 to respond to an interrupt without first saving a plurality of registers of normal set 226 to main memory 104. An interrupt occurs at any point in the program code. An interrupted program, which is a portion of the program code, is referred-to as an interruptee or a main program. As the main program is executed by processor 102, the main program uses normal set 226.

Processor 102 uses, such as writes data to and reads data from, normal set 226 during execution of the main program and uses, such as writes data to and reads data from, shadow set 228 during execution of an interrupt service routine (ISR). The ISR and a funnel code that includes a prologue and an epilogue to the ISR are included within an interrupt handler. Processor 102 uses normal set 226 upon returning to the main program from the ISR. Shadow register provides a unique context for executing an external interrupt to either reduce or eliminate context overhead, which includes a number of clock cycles used to save data within normal set 226 before calling the ISR. Further, the provision of shadow set 228 reduces worst case interrupt latency, such as from hundreds of cycles to a few cycles. For example, normal set 226 is not used for executing the ISR to service an external interrupt from first interrupt source 204 and/or second interrupt source 206. In this example, upon receiving the external interrupt, there is no need for processor 102 to copy data from normal set 226 to main memory 104. Rather, in this example, processor 102 continues to use normal set 226 upon returning from the ISR. An external interrupt is received from first interrupt source 204 or second interrupt source 206 that is located outside processor 102. The worst case interrupt latency can be measured as an interrupt latency that is longer than other interrupt latencies for a set of external interrupts received by processor 102 during a specific time period.

Generally, shadow sets are expensive. For example, if one shadow set is provided within processor 102 for each interrupt in a nested interrupt including a large number of interrupts received by processor 102 from first interrupt source 204 and/or second interrupt source 206, the cost of the large number of shadow sets increases. Further, a large main memory is used to exchange data with the large number of shadow sets. Moreover, a number of read multiplexers and associated control logic used to read data from the large main memory increases. Accordingly, processor 102 shares shadow set 228 for nested interrupts. Processor 102 uses the same shadow set 228 for handling an external interrupt received from first interrupt source 204 and for handling an external interrupt received from second interrupt source 206.

In another embodiment, system 200 includes any number of interrupt sources. In yet another embodiment, EIC 202 is part of an external interrupt source, such as first interrupt source 204 or second interrupt source 206.

Figure 3:
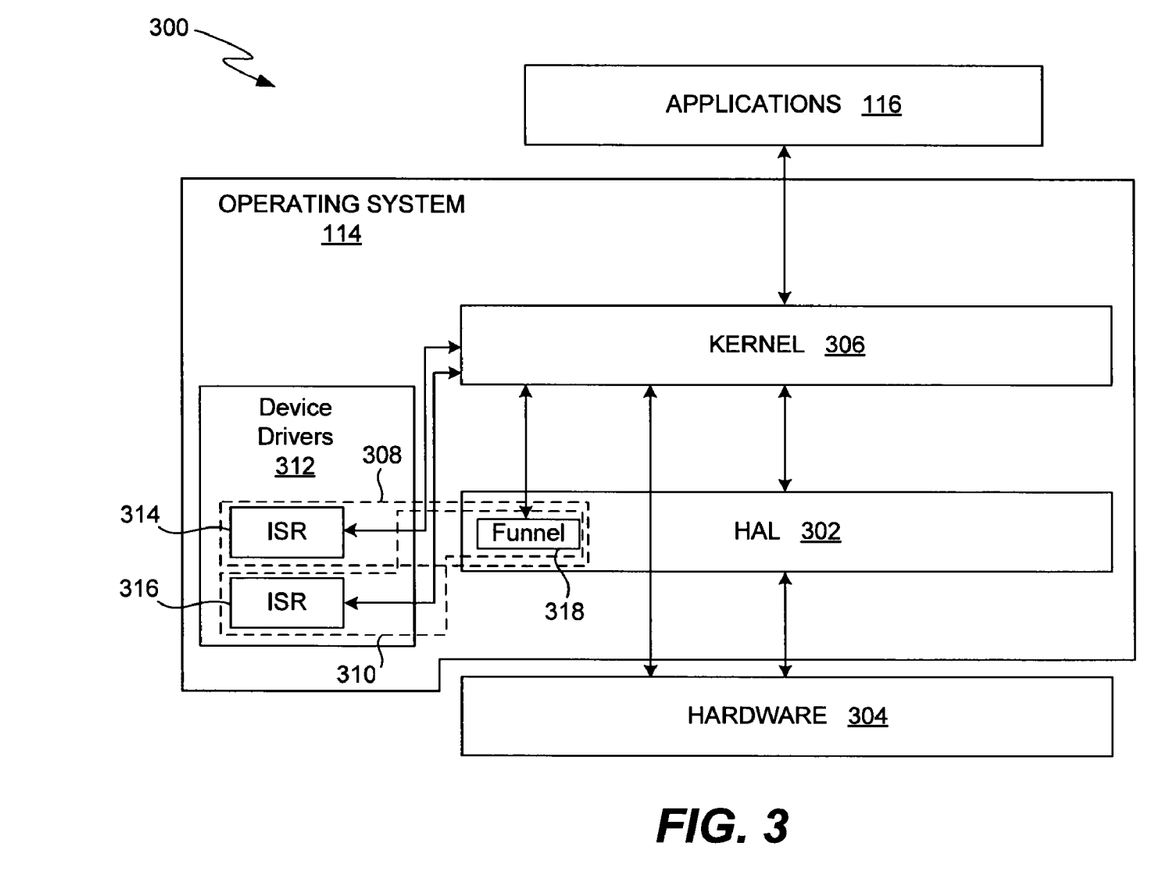
FIG. 3 shows an exemplary architecture of a system for reducing interrupt latency.

FIG. 3 shows an exemplary architecture of a system 300 for reducing interrupt latency. System 300 includes operating system 114 that includes a hardware abstraction layer (HAL) 302. System 300 further includes hardware 304 and a set of application programs 116. Hardware 304 may be processor 102, main memory 104, display device 106, input device 108, I/O interface 110, or system 100 of FIG. 1. Operating system 114 includes a kernel 306, a first interrupt handler 308, a second interrupt handler 310, and a set 312 of device drivers. Set 312 of device drivers include a first ISR 314 and a second ISR 316. Each of first ISR 314 and second ISR 316 is included within set 312 of device drivers and is specific to one of the system devices. First interrupt handler 308 includes a funnel 318 and first ISR 314. Second interrupt handler 310 includes funnel 318 and second ISR 316. First interrupt handler 308 is a code executed by processor 102 to process an external interrupt received from first interrupt source 204 and second interrupt handler 310 is a code executed by the processor 102 to process an external interrupt received from second interrupt source 206. Funnel 318 is a code executed by processor 102 to set up a state of processor 102 before calling first ISR 314 or second ISR 316 and restore the state after the first or second ISR 316 returns. For example, funnel 318 includes the prologue to first ISR 314 and second ISR 316 and the epilogue to the first ISR 314 and second ISR 316. When an interrupt occurs, interrupt processing, such as interrupt handling, effectively takes place in between instructions of the main program. An interrupt-handler does all its work and returns control to the main program without modifying data of any of normal set 226. Each of first interrupt handler 308 and second interrupt handler 310 may be written using C programming language or assembly language.

HAL 302 is a layer of software that hides hardware 304 differences from operating system 114. Main memory 104 may include HAL 302. As a result, different types of hardware 304 look alike to operating system 114 and there is no need to specifically tailor operating system 114 to hardware 304. HAL 302 includes a set of function calls that allow the same device driver of set 312 of device drivers to drive different types of hardware 304. Kernel 306 schedules activities, such as executing application programs 116, for system 100 to perform by controlling a set of resources, such as main memory 104, display device 106, input device 108, I/O interface 110, and the peripheral device, of hardware 304.

Figure 4:
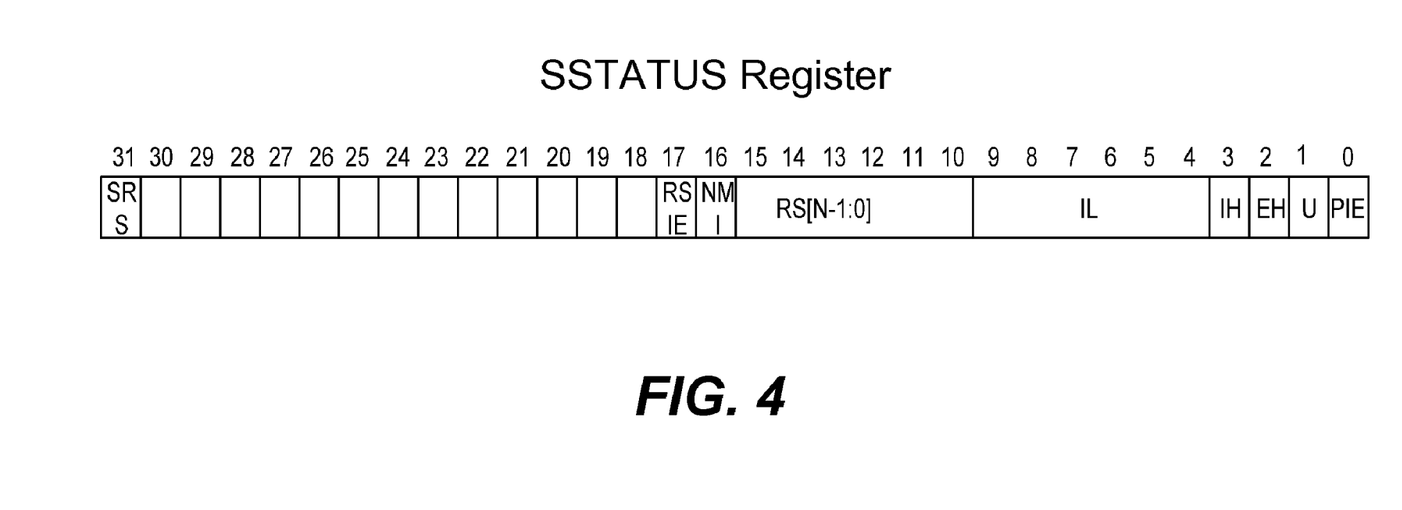
FIG. 4 shows an embodiment of an SSTATUS register within a plurality of register sets of the system of FIG. 2.

FIG. 4 shows an embodiment of an SSTATUS register within shadow set 228 (FIG. 2). The SSTATUS register includes a plurality of fields including a switched register set (SRS) field, a register set interrupt enable (RSIE) field, a non-maskable interrupt (NMI) field, a register set (RS) field, an interrupt level (IL) field, an interrupt handler mode (IH) field, an exception handler mode (EH) field, a user mode (U) field, and a processor interrupt enable (PIE) field. The SRS field includes a dedicated bit that acts as a sign bit of the SSTATUS register.

Format of the STATUS register, the BSTATUS, and the ESTATUS register is the same as that of the SSTATUS register except that the STATUS, BSTATUS, and ESTATUS registers do not include the SRS field. Each of the STATUS, BSTATUS, ESTATUS, and SSTATUS registers is a status register (FIG. 2). The status registers STATUS, BSTATUS, ESTATUS, SSTATUS are augmented with the RS field if shadow set 228 is included within processor 102 and augmented with the IL field if first interrupt source 204 and/or second interrupt source 206, external to processor 102, is connected to processor 102. The SSTATUS register has the same register number as a breakpoint return address (BA) in normal set 226.

Processor 102 sets the SRS field to 1 upon receiving an external interrupt from first interrupt source 204 or second interrupt source 206 if the external interrupt results in a change in any of the remaining registers of the STATUS register, and sets the SRS field to 0 otherwise. Processor 102 may reset the SRS field to 0.

Processor 102 sets the RSIE field to 0 to prevent taking an external interrupt that will use a current register set, described below. Processor 102 sets the RSIE field of the STATUS register to 1 after an external interrupt is taken.

Processor 102 sets the NMI field to 1 to not allow servicing of another external interrupt from first interrupt source 204 and/or second interrupt source 206 during a time an external interrupt from first interrupt source 204 and/or second interrupt source 206 is serviced by the processor 102, and sets the NMI field to 0 to allow the servicing of the other external interrupt during the time. A non-maskable interrupt informs processor 102 of a critical system, such as first interrupt source 204 or second interrupt source 206, that requests immediate attention from processor 102. A non-maskable interrupt has a higher priority from among a set of non-reset exceptions, such as debug exceptions. The debug exceptions are used to debug a fault condition, such as a malfunction, of processor 102 or any component, such as register file 216 or ALU 222, of the processor 102.

Processor 102 sets the RS field of the STATUS register to 0 to indicate an index of normal set 226, and sets the RS field of the STATUS register to a non-zero value to indicate an index of shadow set 228 from a plurality of shadow sets (not shown) of the processor 102. An index of a set, such as shadow set 228, within processor 102 is provided by EIC 202 (FIG. 2) and the index is a designation of the set requested by the EIC 202 to process an external interrupt from first interrupt source 204 and/or second interrupt source 206. Processor 102 switches to using a set, such as normal set 226 or shadow set 228, during processing an external interrupt and returns to using a preceding set after processing the external interrupt. The RS field may be between 1 and 6 bits in length. The RS field specifies an index, within the STATUS register, of shadow set 228 that is the current set currently used by an external interrupt, and specifies an index, within the BSTATUS, ESTATUS, or SSTATUS register, of shadow set 228 that may be the preceding set used by an external interrupt preceding to the current use. For example, an index of the preceding set is located in the RS field of the ESTATUS register if normal set 226 is currently used (ESTATUS.RS=0) and is located in the RS field of the SSTATUS register if shadow set 228 is currently used (SSTATUS.RS≠0).

Processor 102 sets the IL field to a value to allow an external interrupt having a value higher than a value in the IL field to be processed and not allow an external interrupt having a value equal to or lower than the value in the IL field to be processed. For example, if a first external interrupt level of a first external interrupt received from first interrupt source 204 or second interrupt source 206 is higher than a second external interrupt level of a second external interrupt that processor 102 is processing, processor 102 prioritizes the processing of first external interrupt and if the first external interrupt level is equal to or lower than the second interrupt level, processor 102 does not prioritize the first external interrupt. An external interrupt, received by EIC 202 from first interrupt source 204 or second interrupt source 206, has a higher priority in processing than processing of an internal interrupt generated from within processor 102, and a non-maskable interrupt, internal or external, has a higher priority in processing than processing of a maskable interrupt, internal or external.

Processor 102 sets the IL field to 0 to enable processing of all external interrupts received from first interrupt source 204 and second interrupt source 206, and sets the IL field to a high value, such as 63 or 65, to disable processing of all maskable external interrupts. The IL field includes a number of bits, such as 4 or 6.

Processor 102 sets the U field to 1 during a time hardware 304 is in the user mode and to 0 during a time hardware 304 is in the privileged mode. Processor 102 sets the PIE field to 0 to disable processor 102 from servicing an interrupt and sets the PIE field to 1 to enable processor 102 to service the interrupt.

The IH field informs operating system 114 if operating system 114 is returning to the main program, which is a foreground application, from an ISR or to service another interrupt from an ISR. For example, if the IH field is set to 1 by processor 102, operating system 114 determines that the operating system 114 is returning to service another interrupt from servicing an interrupt and if the IH field is set to 0 by the processor 102, the operating system 114 determines that the operating system 114 is returning to the main program from servicing another interrupt. When returning to the main program from servicing an external interrupt, operating system 114 considers switching threads of the main program. When returning to the main program from servicing an external interrupt, operating system 114 executes the epilogue to save data stored within the STATUS register into the SSTATUS register, to set the PIE field of the STATUS register to 0 to disable all interrupts during the execution of the prologue, and to determine whether the IH field is 0. If the IH field is 0, operating system 114 switches to the highest priority thread of the main program among all threads of the main program, and restores the STATUS register to the data that is saved in the SSTATUS register during the epilogue.

In another embodiment, the SRS field of the SSTATUS register is located at a position other than the most significant bit position or the sign-bit position of the SSTATUS register.

Figure 5:
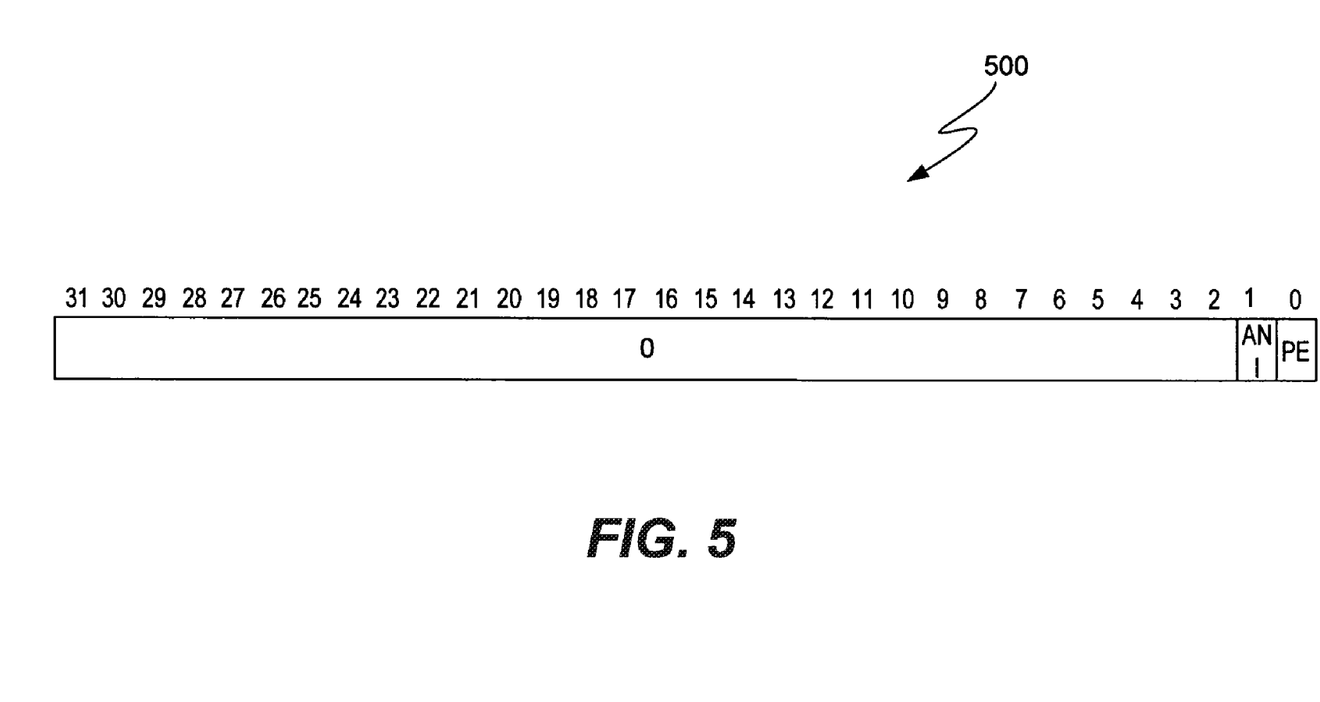
FIG. 5 shows an exemplary format of a configuration register of the register sets.

FIG. 5 shows an exemplary format of a configuration register 500, which is an example of the configuration register (FIG. 2) of set 227 of control registers. Processor 102 does not save data stored within configuration register 500 into main memory 104 upon occurrence of an external interrupt. Configuration register 500 includes an automatic nested interrupts (ANI) field and a protection enable (PE) field. Processor 102 sets the ANI field to 1 or 0. When the ANI field is set to 0, a permission of operating system 114 is obtained before enabling processing of nested external interrupts. The nested external interrupts include an external interrupt received from first interrupt source 204 or second interrupt source 206 at a time processor 102 services another external interrupt received from first interrupt source 204 or second interrupt source 206. Without receiving the permission from operating system 114, processor 102 does not service an external interrupt received from first interrupt source 204 or second interrupt source 206 at a time processor 102 is servicing another external interrupt received from first interrupt source 204 or second interrupt source 206. When the ANI field set to is 1, hardware 304, such as processor 102, automatically services the nested interrupts. For example, if processor 102 receives a first external interrupt from first interrupt source 204 or second interrupt source 206 at a time processor 102 is servicing a second external interrupt received from first interrupt source 204 or second interrupt source 206, processor 102 automatically determines to service the second external interrupt without requesting permission from operating system 114. Upon setting the ANI field to 0, processor 102 sets the PIE field of the STATUS register to 0 and upon setting the ANI field to 1, processor 102 sets the PIE field to 1. Processor 102 is enabled to receive an external interrupt if the PIE field of the STATUS register is set to 1 and is disabled to receive the external interrupt if the PIE field is set to 0.

Figure 6:
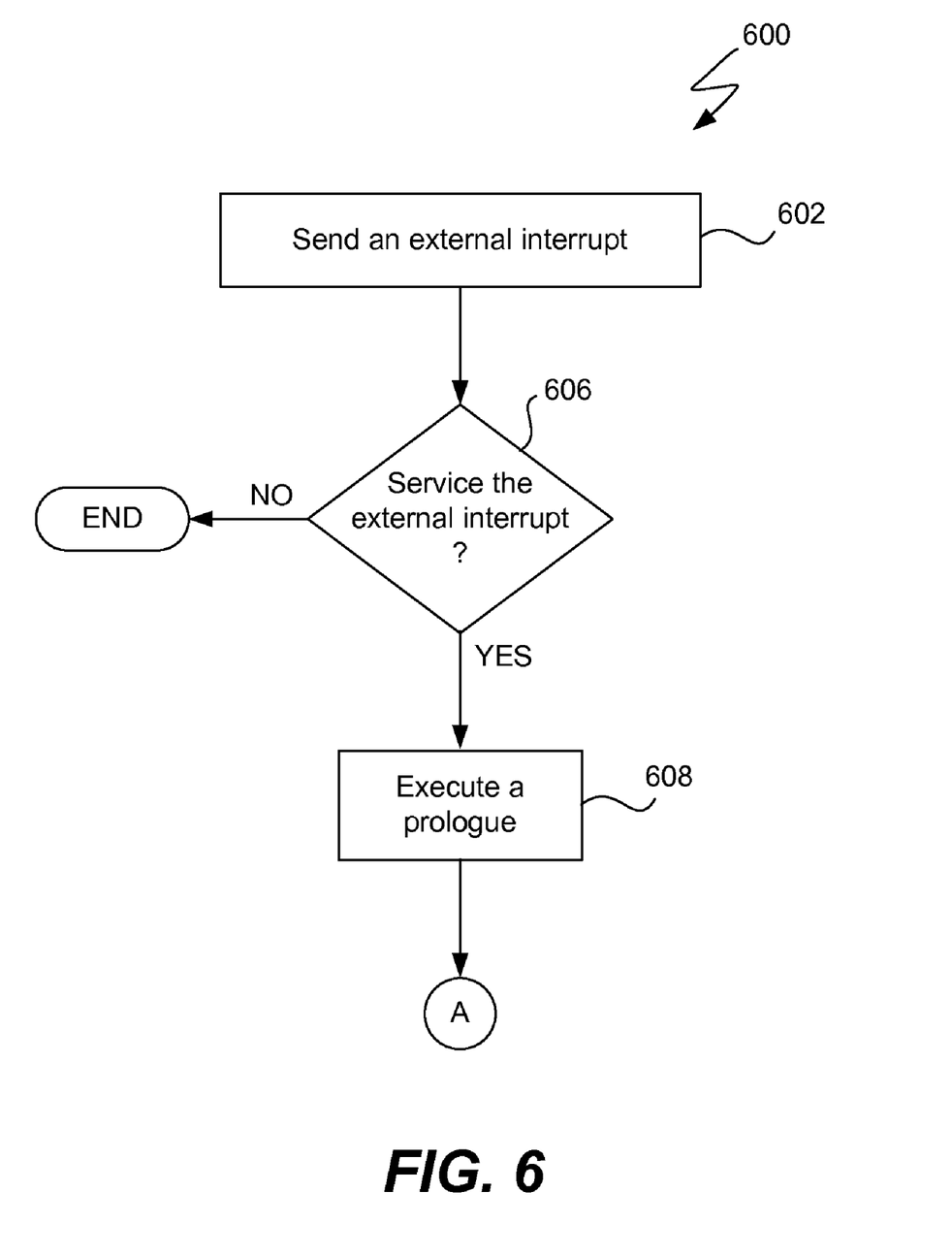
FIG. 6 is a flowchart of an embodiment of a method for reducing interrupt latency.
Figure 7:
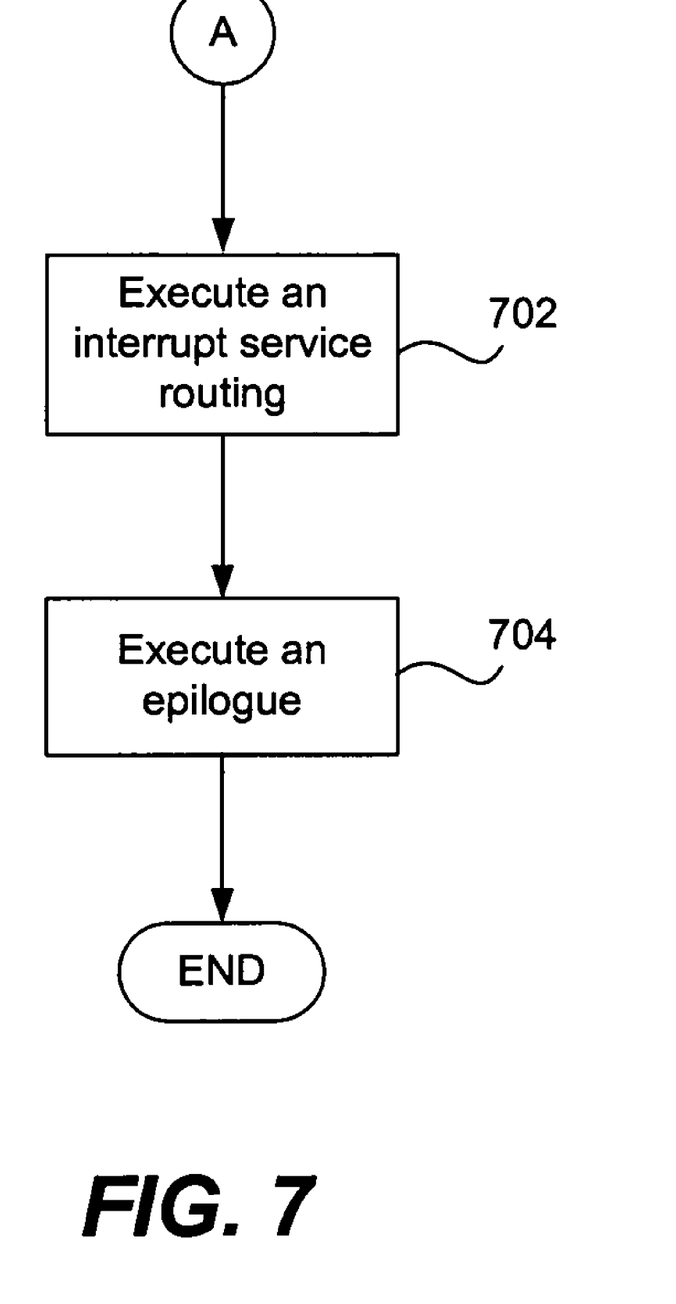
FIG. 7 is a continuation of the flowchart of FIG. 6.
Figure 8:
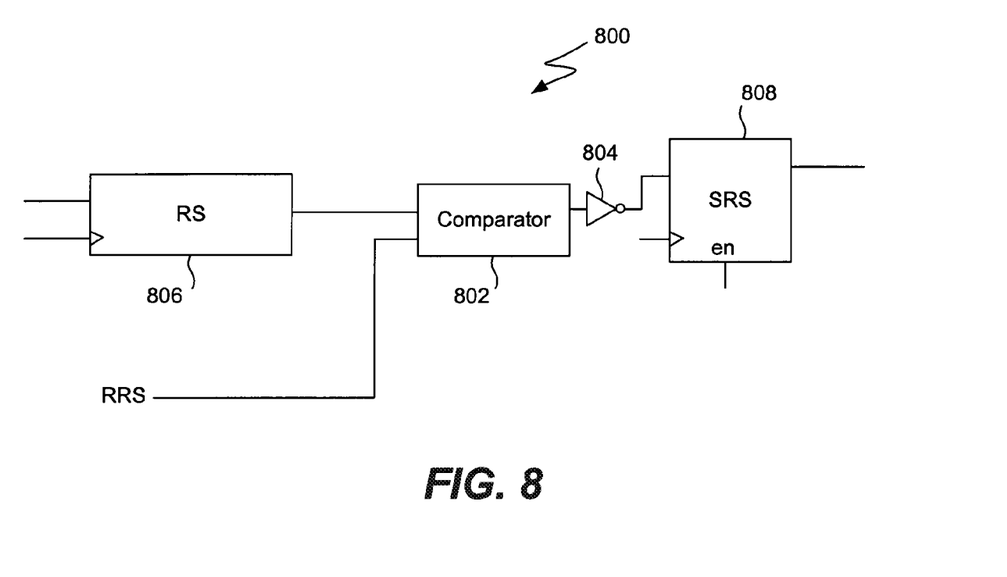
FIG. 8 is a diagram of an embodiment of an architecture of a portion of a processor used to execute the method of FIGS. 6 and 7.

FIGS. 6 and 7 is a flowchart of an embodiment of a method 600 for reducing interrupt latency, and FIG. 8 is a diagram of an embodiment of an architecture 800 within processor 102 used to execute the method. Second interrupt source 206 sends 602 an external interrupt to processor 102 by sending interrupt information to the processor 102. The interrupt information includes an address of interrupt handler 310 (RHA—requested handler address), a register set (RRS—requested register set), an interrupt level (RRL—requested interrupt level), and whether an interrupt received from second interrupt source 206 is non-maskable (RNMI—requested non-maskable interrupt). The RHA has at least the same number of bits as the PC.

EIC 202 (FIG. 2) receives a set of external interrupts from first interrupt source 204 and/or second interrupt source 206, and maps each of the interrupts to a particular set, such as normal set 226 or shadow set 228, of register file 216. EIC 202 maps an external interrupt by allocating a particular set, such as normal set 226 or shadow set 228, used to store data generated from the external interrupt. Examples of data generated from an external interrupt includes data used to execute first ISR 314 or second ISR 316 called upon receiving the external interrupt. Another example of data generated from an external interrupt includes the interrupt information.

EIC 202 chooses from among multiple external interrupts received from first interrupt source 204 and/or second interrupt source 206, and sends the interrupt information regarding the chosen external interrupt to processor 102. EIC 202 uses a scheme, such as fixed priority, dynamic priority, and round-robin, to choose from among multiple external interrupts received from first interrupt source 204 and/or second interrupt source 206. Processor 102 does not have knowledge about the scheme. EIC 202 reduces cause latency, selection latency, and call overhead. EIC 202 includes a vectored interrupt controller (VIC) that prioritizes external interrupts received from first interrupt source 204 and/or second interrupt source 206, and provides processor 102 with an address of first interrupt handler 308 or second interrupt handler 310, that has the higher priority. The VIC computes an address of an interrupt handler by multiplying an index of an external interrupt having the highest priority from among multiple external interrupts received from first interrupt source 204 and/or second interrupt source 206 by a constant to generate a result and adds the results to a base address in a vector table of the VIC.

A VIC device driver that drives the VIC is located within HAL 302 that includes a code that defines one of a first HAL funnel, a second HAL funnel, a third HAL funnel, and a fourth HAL funnel that is used by an interrupt. Processor 102 executes HAL 302 to use a mapping of each set, such as normal set 226 or shadow set 228, within register file 216 with each interrupt and information regarding whether preemption is enabled for each set, such as normal set 226 or shadow set 228, within register file 216 to determine whether to use the first, second, third, or fourth HAL funnels. HAL 302 configures a vector base register of HAL 302 to point to a base address of the vector table and a vector size register to include a value, such as, 8 or 16 bytes. If processor 102 is configured to disable interrupts (STATUS.PIE=0), HAL 302 can enable servicing of an interrupt by changing the PIE field of the STATUS register to 1. HAL 302 checks the IH field to determine whether a return (ERET) instruction, described below, returns to the main program or to another interrupt.

Processor 102 executes the first HAL funnel upon determining that an internal interrupt is associated with normal set 226 and preemption for the set is disabled. The first HAL funnel preserves context of normal set 226. The first HAL funnel is executed by processor 102 to set an address of an ISR used to service an internal interrupt and to save context by pushing the register ESTATUS and a register EA of register file 216, an RA register of register file 216, and a plurality of registers R1-R15 of register file 216 to the stack pointed to by the SP. The first HAL funnel is further executed by calling an ISR, popping the registers R1-R15, RA, EA, and ESTATUS to restore context, subtracting the integer n from the EA register, and restoring the stack pointed to by the SP. The EA and ESTATUS registers are preserved by pushing the registers to allow an interrupt handler to take a non-interrupt exception, such as a trap instruction.

Processor 102 executes the second HAL funnel upon determining that an internal interrupt is mapped to normal set 226 and preemption for the set is enabled. The second HAL funnel is executed by processor 102 to set an ISR address. The second HAL funnel is executed by pushing the EA, ESTATUS, and STATUS registers to the stack pointed to by the SP, setting the RSIE field of the STATUS register to 1, writing data within the EA register to the STATUS register, saving context by pushing the R1-R15 registers and the RA register to the stack, and calling an ISR. The second HAL funnel is further executed by popping the registers R1-R15 and RA to restore context, popping the STATUS register to disable preemption, popping the EA and ESTATUS registers, subtracting the integer n from the EA register, and restoring the stack.

The third HAL funnel is executed by processor 102 upon determining that an external interrupt is mapped to shadow set 228 and preemption for the set is enabled. The third HAL 302 function detects whether first or second interrupt handler 310 assigned to shadow set 228 is active, such as in processing, and upon that the interrupt handler is active, preserves context of the set. The third HAL funnel is executed by processor 102 to push an ET register of register file 216, the EA register, SSTATUS register, and STATUS register to the stack pointed to by the SP, setting the RSIE field of the STATUS register to 1, writing the EA register to the STATUS register, checking the SRS field of the SSTATUS register, calling first or second ISR 316, returning from an interrupt handler including the ISR, pushing the R1-R15 and RA registers, and popping the R1-R15 and RA registers. Processor 102 calls first ISR 314 or second ISR 316 during the execution of the third HAL funnel by calling the register R15, popping the EA and STATUS registers, and examining the SRS field of the SSTATUS register. Processor 102 returns from first interrupt handler 308 or second interrupt handler 310 used in executing the third HAL funnel by restoring the stack and subtracting the integer n from the EA register. The third HAL funnel may enable interrupts in the current set by setting the RSIE field of the STATUS register to 1. When first or second ISR 316 returns, the third HAL funnel pops the value of the STATUS register to set the RSIE field of the STATUS register back to 0. When the RSIE field of the STATUS register is 0, preemption is disabled and the third HAL funnel completes. The third HAL funnel preserves the R1-R15 and RA registers if the funnel detects that another external interrupt is running in shadow set 228 when an external interrupt is taken. The third HAL funnel uses a bit in the SRS field of the SSTATUS register as bit 31, corresponding to a sign bit, to determine when the RS field of the STATUS register is changed by an external interrupt. The third HAL funnel is optimized for a plurality of chained external interrupts that can use shadow set 228 by preempting first ISR 314 or second ISR 316 with a higher priority external interrupt and skipping an overhead of preserving the R1-R15 and RA registers.

The fourth HAL funnel is executed by processor 102 upon determining that an external interrupt is mapped to shadow set 228 and preemption for the set is disabled. The fourth HAL funnel does not preserve context because there is one ISR, which is first ISR 314 or second ISR 316, at a time running in shadow set 228. First ISR 314 or second ISR 316 using the fourth HAL funnel have an ISR type of IRQ or FIQ. Processor 102 executes the fourth HAL funnel by setting an address of first ISR 314 or second ISR 316, calling the ISR, and subtracting the integer from the EA register. In executing the fourth HAL funnel, the overhead of entering and exiting an external interrupt is small. If an ISR type of first ISR 314 or second ISR 316 using the fourth HAL funnel is FIQ, the ISR does not execute a return from a call from the fourth HAL funnel. If there is one external interrupt assigned to shadow set 228 and the interrupt has an ISR type of FIQ, the interrupt has exclusive access to the shadow set 228. This exclusive access allows first ISR handler 308 or second ISR handler 310 to save data within shadow set 228 that is not modified from interrupt to interrupt. The third HAL funnel and the fourth HAL funnel are examples of funnel 318.

HAL 302 provides facilities including a first facility and a second facility for set 312 of device drivers and interrupts. HAL 302 links in the first facility or the second facility used by one or more device drivers within set 312. The first and second facilities are described below. The first facility is used for internal interrupts and the second facility is used for external and internal interrupts.

Set 312 of device drivers are modified to use the second facility. HAL 302 accepts an interrupt IRQ argument including a plurality of IRQ values. The IRQ values are defined in an h field of a system register of HAL 302. Internal interrupts have IRQ values ranging from 0 to 31. An IRQ value of an internal interrupt indicates a priority of an interrupt with 0 being the highest priority and 31 the lowest priority.

External interrupts have IRQ values ranging from 0 to 31. An IRQ value for an external interrupt does not imply anything about a priority of the external interrupt. An IRQ value of an external interrupt is not sufficient to identify the external interrupt because multiple EICs may be connected to processor 102. HAL 302 assigns a unique interrupt controller identification (ID) to each interrupt controller, such as EIC 202, connected to processor 102. If multiple internal interrupt controllers are present within system 200 (FIG. 2), there is one ID is for each internal interrupt controller. If multiple EICs are present within system, there is one ID for each EIC 202. HAL 302, defines within the system.h file, an ID for each interrupt controller and an ID for each interrupt source along with an IRQ value of an external interrupt.

The first interrupt facility includes a plurality of routines called by one or more device drivers within set 312 by using an ISR and a plurality of routines called by HAL 302 to manage a plurality of internal interrupts.

In the first facility, HAL 302 stores an ISR argument and an ISR context argument for each internal interrupt in an array of IRQ values, and the array is referred to as alt_irq. An index into the array is an IRQ value. The ISR context argument is a pointer to pass context-specific information to an ISR and can point to any ISR specific information.

In this first facility, HAL 302 stores an alt_irq_register routine, an alt_irq_interruptible routine, an alt_irq_not_interruptible routine, an alt_irq_disable_all routine, an alt_irq_enable_all routine, and alt_irq_disable routine, and an alt_irq_enable routine. The alt_irq_register routine is called by a device driver within set 312 to register an instance of ISR with HAL 302. The alt_irq_register routine includes an IRQ argument that is an IRQ value, and an ISR argument that is a pointer to a device specific ISR. The alt_irq_register routine uses an IRQ value to index into the alt_irq array and stores the ISR context and ISR arguments into the array. The alt_irq_interruptible routine is called from an ISR to enable pre-emption of an internal interrupt. The alt_irq_interruptible routine includes a priority argument that is used to enable internal interrupts higher in priority than a priority specified by the priority argument. A mask value of an internal interrupt is passed to the alt_irq_not_interruptible routine when disabling pre-emption of another internal interrupt.

The alt_irq_not_interruptible routine is called from an ISR to disable pre-emption of an internal interrupt. The alt_irq_not_interruptible routine includes a mask argument that is used to disable a priority specified by the mask argument.

The alt_irq_disable_all routine sets and alt_irq_enable_all routine clears the PIE field of the STATUS register. The alt_irq_disable and alt_irq_enable routines accept the IRQ argument and do not include an ID of an interrupt controller.

The second facility includes routines called by a device driver within set 312, routines called by the device driver with an ISR, and routines called by HAL 302 to manage interrupts.

An internal interrupt controller (not shown) of processor 102 and EIC 202 has an associated device driver within set 312. In the second facility, HAL 302 includes an alt_ic_create_instance routine, an alt_isr_create_instance routine, an alt_isr_interruptible routine, an alt_isr_not_interruptible routine, an alt_irq_disable_all routine, an alt_irq_enable_all routine, an alt_irq_disable routine, and an alt_irq_enable routine. One of device drivers of set 312 of device drivers calls the alt_ic_create_instance routine of the second facility to register an instance of an ISR, such as first ISR 314 or second ISR 316, with HAL 302. The alt_ic_create_instance routine of the second facility includes an ic_id argument that is an ID of an interrupt controller, such as an internal interrupt controller or EIC 202. The alt_ic_create_instance routine of the second facility includes a base argument that is an address of a plurality of memory-mapped registers of an interrupt controller, such as an internal interrupt controller or EIC 202. The alt_ic_create_instance routine of the second facility includes an rtns arguments that has a structure that contains routines implemented by an interrupt controller, such as an internal interrupt controller or EIC 202, called by HAL 302.

The alt_ic_create_instance routine of the second facility includes an ic_context argument that is a pointer that points to an instance of data structure associated with one of the device drivers of set 312 of device drivers. One of the device drivers of set 312 of device drivers calls the alt_isr_create_instance routine of the second facility by using an ic_id argument that is an ID of an internal interrupt controller or EIC 202.

The alt_irq_create_instance routine of the second facility includes an irq argument that is an IRQ value. The alt_irq_create_instance routine of the second facility includes an isr_type argument that informs HAL 302 of a set of characteristics of an ISR, such as first ISR 314 or second ISR 316. The set of characteristics includes whether an ISR is executed based on IRQ, FIQ, or SWI.

The isr argument of the second facility is a pointer to the device-specific ISR. The first facility provides an IRQ value as an argument to an ISR. The second facility drops an IRQ value and overhead associated with the IRQ value. In the second facility, if a device driver of set 312 uses an IRQ value, the device driver can pass a request for the IRQ value via the isr_context pointer.

The alt_isr_interruptible routine of the second facility is called from an ISR to enable pre-emption of an interrupt. A mask value is passed to the alt_irq_not_interruptible routine of the second facility when disabling preemption of an interrupt. The alt_isr_interruptible routine of the second facility calls an isr_interruptible routine provided by one of the device drivers, of set 312, that drives an interrupt controller. An internal interrupt controller calls the alt_irq_interruptible routine of the second facility by using a priority argument set to the IRQ value.

The alt_isr_not_interruptible routine of the second facility is called from an ISR, such as first ISR 314 or second ISR 316, to disable pre-emption of an interrupt. The alt_isr_not_interruptible routine of the second facility calls the isr_not_interruptible routine provided by one of the device drivers, of set 312, that drives an interrupt controller. An internal interrupt controller calls the alt_irq_not_interruptible routine of the second facility with a mask argument set a mask value.

The alt_irq_disable_all and alt_irq_enable_all routines of the second facility perform the same functions with respect to internal and external interrupts as that described in the first facility with respect to an internal interrupt.

The alt_ic_irq_disable and alt_ic_irq_enable routines of the second facility accept an ID of an interrupt controller and an IRQ value, and the routines work with internal or external interrupts.

Referring back to FIG. 6, upon receiving the interrupt information regarding an external interrupt, processor 102 determines 606 whether to service the external interrupt. For example, if at a time of receiving an external interrupt from second interrupt source 206, the NMI field of the STATUS register is 0 (STATUS.NMI=0), and the interrupt is a non-maskable interrupt (RNMI=1), processor 102 determines to service the interrupt. As another example, if at a time of receiving an external interrupt from second interrupt source 206, the external interrupt has an interrupt level greater than a value in the IL field of the STATUS register (RIL>STATUS.IL) and processor 102 has enabled servicing of the interrupt (STATUS.PIE=1) and shadow set 228 is enabled to store data generated from the interrupt, processor 102 determines to service the interrupt. As yet another example, if at a time of receiving an external interrupt from second interrupt source 206, the external interrupt has an interrupt level greater than a value in the IL field of the STATUS register (RIL>STATUS.IL) and processor 102 has enabled servicing of the interrupt (STATUS.PIE=1) and a value of the requested register set is the same as that of the RS field of the STATUS register (STATUS.RS), processor 102 determines to service the interrupt. Otherwise, processor 102 determines not to service an external interrupt. For example, if at a time of reception of an external interrupt from second interrupt source 206, the NMI field of the STATUS register is 1 (STATUS.NMI=1), processor 102 determines not to service the interrupt. In this example, processor 102 sets the NMI field to 1 upon receiving an external interrupt from first interrupt source 204 prior to receiving the external interrupt from second interrupt source 206. As another example, at a time of reception of an external interrupt from second interrupt source 206, if the PIE field of the STATUS register is 0, processor 102 determines not to service the interrupt and the method 600 ends.

Upon determining to service an external interrupt received from second interrupt source 206, processor 102 executes 608 the prologue. Processor 102 executes the prologue by writing a sum of a location of an instruction of the program code and the integer n to the EA register. Processor 102 further executes the prologue by setting the PC to the RHA. Processor 102 further executes the prologue by copying the STATUS register to the ESTATUS register if the RRS is zero and by copying the STATUS register to the SSTATUS register if the RRS is not zero. If the RRS is zero, use of normal set 226 is requested and use of a shadow set, such as shadow set 228, of processor 102 is not requested within an interrupt and if RRS is other than zero, use of the shadow set is requested and use of normal set 226 is not requested within the interrupt.

Upon determining to service an external interrupt is received from second interrupt source 206, processor 102 executes the prologue by writing the RS field of the STATUS register with a value of the RRS provided by EIC 202. If an internal interrupt is received, processor 102 writes the RS field of the STATUS register with 0 to use normal set 226 to process the interrupt. If processor 102 sets the RS field of the STATUS register to 0 during a time first interrupt handler 308 is handling an interrupt received from first interrupt source 204 or second interrupt handler 310 is handling an interrupt received from second interrupt source 206 by using shadow set 228, processor 102 processes any non-interrupt exception, such as a divide-by-zero, a trap instruction, or a data access exception without restoring the EA and ESTATUS registers to a state before the non-interrupt exception is received. On the other hand, if processor 102 sets the RS field of the STATUS register to 0 during a time an interrupt handler of processor 102 is handling an internal interrupt, processor 102 processes the non-interrupt exception by controlling an interrupt handler of the processor 102 to restore the EA and ESTATUS registers to a state before the non-interrupt exception is received. Before switching to shadow set 228 to service an external interrupt received from second interrupt source 206, funnel 318 disables any other external interrupts assigned to the set to preserve context of the set.

Processor 102 further executes the prologue by setting the SRS field of the SSTATUS register to 1 if a value within RRS is equal to a value within the RS field of the STATUS register and by setting the SRS field to 0 if the value within RRS is not equal to the value within the RS field. Specifically, processor 102 includes a comparator 802, shown in FIG. 8, that executes the prologue by comparing the RS field of the STATUS register during the preceding use with the RS field of the STATUS register during the current use. For example, as shown in FIG. 8, comparator 802 compares a value of RRS received from second interrupt source 206 with a value of the RS field of the STATUS register. In this example, the RRS value is equal to the value of the RS field during the current use. Upon determining that the RS field of the STATUS register during the preceding use is the same as the RS field of the STATUS register during the current use, comparator 802 outputs a 0, which is negated by a NOT gate 804 to output a 1, which is the dedicated bit received by the SRS field of the SSTATUS register. For example, upon determining that the RS field of the STATUS register is equal to RRS, comparator 802 outputs a 0, which is negated by NOT gate 804 to output a 1. Upon determining that the RS field of the STATUS register during the preceding use is not the same as the RS field of the STATUS register during the current use, comparator 802 outputs a 1, which is negated by NOT gate 804 to output a 0, which is the dedicated bit received by the SRS field of the SSTATUS register. For example, upon determining that the RS field of the STATUS register is not equal to RRS, comparator 802 outputs a 1, which is negated by NOT gate 804 to output a 0.

In FIG. 8, the RS field of the STATUS register is an RS register 806. Further, the SRS field of the SSTATUS register is shown in FIG. 8 as an SRS register 808, which is enabled by first interrupt handler 308 of processor 102 upon determining to service an external interrupt received from second interrupt source 206. Otherwise, if first interrupt handler 308 of processor 102 determines not to service an external interrupt received from second interrupt source 206, first interrupt handler 308 disables SRS register 808. A data input of comparator 802 is coupled to a data output of RS register 806 and another data input of the comparator 802 is coupled to receive the RRS. A data output of comparator 802 is coupled to NOT gate 804 and an output of the gate is coupled to a data input of SRS register 808.

During execution of the prologue, first interrupt handler 308 of processor 102 determines to save data stored within shadow set 228 to main memory 104 upon determining that the SRS field includes a 1 and determines not to save data stored within the shadow set 228 to main memory 104 upon determining that the SRS field includes a 0. For example, first interrupt handler 308 reads the SRS field of the SSTATUS register to determine whether the field includes the dedicated bit of 1 or 0. Upon determining that the SRS field includes the dedicated bit of 1, first interrupt handler 308 determines that RRS is equal to the RS field of the STATUS register during the preceding use and further determines to save data, generated from an external interrupt received from first interrupt source 204, stored within shadow set 228 to main memory 104 and processor 102 writes the data to main memory 228 from the shadow set. On the other hand, upon determining that the SRS field includes the dedicated bit of 0, first interrupt handler 308 determines that RRS is not equal to the RS field of the STATUS register during the preceding use and further determines not to save data, generated from an external interrupt received from first interrupt source 204, stored within shadow set 228 to main memory 104 and processor 102 does not write the data to main memory 228 from the shadow set.

Processor 102 continues to execute the prologue by setting the PIE field of the STATUS register to 0 if a configure automatic nested interrupts (CONFIG.ANI) field within the configuration register 500 is 1 and sets the PIE field to 1 if the CONFIG.ANI field is zero. Processor 102 further executes the prologue by setting the U field of the STATUS register to 0, leaving the EH field of the STATUS register unchanged, and setting the IH field of the STATUS register to 1. Processor 102 further executes the prologue by setting the IL field of the STATUS register to RIL to disable an external interrupt at a value equal to or lower than RIL, and by setting the RSIE field of the STATUS register to 0. If the PIE field of the STATUS register is set to 0 by processor 102, operating system 114 sets the PIE field to 1 with a write control (WRCTL) instruction to re-enable nested interrupts during the prologue. The value of the EH field of the STATUS register has no effect on the prologue because the EH field ins unrelated to an external interrupt received from first interrupt source 204 or second interrupt source 206.

Referring back to FIG. 7, processor 102 executes 702 second ISR 316 after executing the prologue. Processor 102 executes 704 the epilogue after executing second ISR 316. Processor 102 executes the epilogue by executing the ERET instruction. Processor 102 executes the ERET instruction to return to an instruction of the main program at a location at an address that is a difference between a location stored in the EA register and the integer n. Processor 102 further executes the ERET instruction by setting the PC to normal set 226 or shadow register specified by the RS field of the STATUS register.

Processor 102 further executes the ERET instruction by writing data within the ESTATUS register into the STATUS register if the RS field of the STATUS register is zero and writing data within the SSTATUS register into the STATUS register if the RS field of the STATUS register is not zero, and the writing to the STATUS register is not performed by using a write control (WRCTL) instruction. Processor 102 executes the ERET instruction by determining whether the NMI field of the STATUS register has a value of 1 before the ERET instruction is executed and upon determining that the NMI field has the value of 1, processor 102 writes to the NMI field. Otherwise, upon determining that the value in the NMI field of the STATUS register is 0, processor 102 does not write to the NMI field. The ERET instruction, provided by the user via input device 108, has a B field set to a number identifying the SSTATUS register and an A field set to a number identifying the EA register.

Processor 102 cannot execute the ERET instruction to change value in the NMI field of the STATUS register from 0 to 1. Processor 102 can execute the ERET instruction to change value in the NMI field of the STATUS register from 1 to 0 or to leave the value as 1. This restriction prevents processor 102 from accidentally masking future nonmaskable interrupts.

In another embodiment, architecture of FIG. 8 does not include NOT gate 804 and the data output of comparator 802 is directly connected with the data input of the SRS field of the SSTATUS register. In this embodiment, upon determining that the RS field of the STATUS register during the preceding use is the same as the RS field of the STATUS field during the current use, comparator 802 outputs a 1, which is the dedicated bit received by the SRS field of the SSTATUS register. Further, in this embodiment, upon determining that the RS field of the STATUS register during the preceding use is not the same as the RS field of the STATUS field during the current use, comparator 802 outputs a 0, which is the dedicated bit received by the SRS field of the SSTATUS register.

Technical effects of the herein described systems and methods for reducing interrupt latency including saving time and costs. The addition of the SRS field to the SSTATUS register saves time and costs. The determination of whether to save data within shadow set 228 based upon the SRS field reduces interrupt latency. Interrupt latency is reduced by not executing a large number of cycles including a cycle for executing a branch instruction and a set of cycles for communicating with register file 216 to determine whether to save data within shadow set 228 to main memory 104.

Without using the SRS field of the SSTATUS register, if first interrupt source 204 and second interrupt source 206 are allocated shared use of shadow set 228, hardware 304 automatically switches to the set upon receiving an external interrupt from first interrupt source 204 or second interrupt source 206. Further, without using the SRS field of the SSTATUS register, second interrupt handler 310 determines whether shadow set 228 is in use for an external interrupt received from first interrupt source 204 at a time an external interrupt is received from second interrupt source 206. Further, without using the SRS field of the SSTATUS register, if first interrupt handler 308 is in use, second interrupt handler 310 saves data within shadow set 228 to main memory 104 before using shadow set 228 to service an external interrupt received from second interrupt source 206. On the other hand, if second interrupt source 206 does not interrupt first interrupt handler 308, second interrupt handler 310 does not save data within shadow set 228 to main memory 104 and uses the set to without incurring an interrupt latency of saving the data.

Without using the SRS field of the SSTATUS register, in order to make a determination whether first interrupt handler 308 is using shadow set 228, second interrupt handler 310 performs a plurality of complex operations including performing a branch instruction and reading a few registers within register file 216. The complex operations count against interrupt latency. The complex operations includes an analysis rather than reading the SRS field of the SSTATUS register. The execution of the complex operations take more cycles than that taken to read the SRS field of the SSTATUS register. Further, without using the SRS field of the SSTATUS register, most of the time, second interrupt handler 310 determines that shadow set 228 is used by first interrupt handler 308 and saves data within the set to main memory 104. Accordingly, if the SRS field of the SSTATUS register is not used, it is beneficial to save data of shadow set 228 into main memory 104 without determining whether shadow set 228 is used by first interrupt handler 308 to avoid interrupt latency associated with making the determination.

It is noted that in various embodiments described herein, the main program is an ISR.

Although the foregoing systems and methods have been described in detail by way of illustration and example for purposes of clarity and understanding, it will be recognized that the above described systems and methods may be embodied in numerous other specific variations and embodiments without departing from the spirit or essential characteristics of the systems and methods. Certain changes and modifications may be practiced, and it is understood that the systems and methods are not to be limited by the foregoing details, but rather is to be defined by the scope of the appended claims.

What is claimed is:

1. A system for reducing interrupt latency, said system comprising:
   a first interrupt source configured to generate a first interrupt;
   a second interrupt source configured to generate a second interrupt; and
   a processor including a plurality of shadow sets configured to store data used to service interrupts, wherein said processor receives the first interrupt and a designation of a first shadow set to service said first interrupt,
   wherein said processor receives the second interrupt and receives a designation of a shadow set to service the second interrupt,
   wherein said processor is further configured to determine, based on a dedicated bit, whether said shadow set to service the second interrupt is said first shadow set.

2. A system in accordance with claim 1, wherein said processor is further configured to determine that said shadow set to service the second interrupt is said first shadow set in response to determining that the dedicated bit has a first value, wherein said processor is further configured to determine that said shadow set to service the second interrupt is not said first shadow set in response to determining that the dedicated bit has a second value other than the first value.

3. A system in accordance with claim 1, wherein said processor executes a main program, wherein said processor includes a normal set, wherein said processor is further configured to use said normal set to execute the main program.

4. A system in accordance with claim 1, wherein the dedicated bit includes only a single bit.

5. A system in accordance with claim 2, wherein said system further comprises a main memory configured to store data, wherein said processor is further configured to determine whether the second interrupt has a higher priority than the first interrupt, wherein said processor is further configured to determine to save data from said first shadow set into said main memory upon determining that the second interrupt has the higher priority and that the dedicated bit has the first value.

6. A system in accordance with claim 5 further comprising:

a first status register including a field for a first index identifying said first shadow set to service the first interrupt;

a comparator configured to compare a second index with the first index upon receiving the first and second indexes and further configured to output the dedicated bit as its output, wherein the second index includes a designation of the shadow set to service said second interrupt; and a second status register configured to receive and store the dedicated bit from said comparator, wherein the dedicated bit has the first value or the second value based on the comparison, wherein said processor is further configured to determine that the shadow set to service the second interrupt is the first shadow set to service the first interrupt in response to determining that the dedicated bit has the first value, wherein said processor is further configured to determine that the shadow set to service the second interrupt is different from the first shadow set to service the first interrupt in response to determining that the dedicated bit has the second value.

7. A system in accordance with claim 5, wherein said processor further comprises a normal set configured to store data used to execute a main program, wherein said processor is further configured to determine to save data used to service the first interrupt in said main memory without a need to execute a branch instruction and without a need to analyze data stored within said normal set or said plurality of shadow sets.

8. A system in accordance with claim 6, wherein said first status register stores the second index.

9. A system in accordance with claim 7, wherein said processor takes a first number of cycles to determine, based on the dedicated bit, to save data used to service the first interrupt in said main memory, wherein the first number of cycles is less than a second number of cycles taken to execute the branch instruction and to analyze data stored within said normal set or the plurality of shadow sets.

10. A processor for reducing interrupt latency, said processor comprising:

a plurality of shadow sets configured to store data used to service interrupts, wherein said processor receives a first interrupt received from a first interrupt source and a designation of a first shadow set to service said first interrupt, wherein said processor receives a second interrupt received from a second interrupt source and receive a designation of a shadow set to service the second interrupt, wherein said processor is further configured to determine, based on a dedicated bit, whether said shadow set to service the second interrupt is said first shadow set.

11. A processor in accordance with claim 10, wherein said processor is further configured to determine that said shadow set to service the second interrupt is said first shadow set in response to determining that the dedicated bit has a first value, wherein said processor is further configured to determine that said shadow set to service the second interrupt is not said first shadow set in response to determining that the dedicated bit has a second value other than the first value.

12. A processor in accordance with claim 10, wherein the dedicated bit includes only a single bit.

13. A processor in accordance with claim 11, wherein said processor is further configured to determine whether the second interrupt has a higher priority than the first interrupt, wherein said processor is further configured to determine to save data from said first shadow set into a main memory upon determining that the second interrupt has the higher priority and that the dedicated bit has the first value.

14. A processor in accordance with claim 13 further comprising:

a first status register including a field for a first index identifying said first shadow set used to service the first interrupt;

a comparator configured to compare a second index with the first index upon receiving the first and second indexes and further configured to output the dedicated bit as its output, wherein the second index includes a designation of the shadow set to service said second interrupt; and a second status register configured to receive and store the dedicated bit from said comparator, wherein the dedicated bit has the first value or the second value based on the comparison, wherein said processor is further configured to determine that shadow set to service the second interrupt is the first shadow set to service the first interrupt in response to determining that the dedicated bit has the first value, wherein said processor is further configured to determine that the shadow set to service the second interrupt is different from the first shadow set to service the first interrupt in response to determining that the dedicated bit has the second value.

15. A processor in accordance with claim 13, wherein said processor further comprises a normal set configured to store data used for executing a main program, wherein said processor is further configured to determine to save data used to service the first interrupt in the main memory without a need to execute a branch instruction and without a need to analyze data stored within said normal set or said plurality of shadow sets.

16. A processor in accordance with claim 14, wherein said first status register stores the second index.

17. A processor in accordance with claim 15, wherein said processor takes a first number of cycles to determine, based on the dedicated bit, to save data used to service the first interrupt in the main memory,
- wherein the first number of cycles is less than a second number of cycles taken to execute the branch instruction and to analyze data stored within said normal set or said plurality of shadow sets.

18. A method for reducing interrupt latency, said method comprising:
- receiving a first interrupt from a first interrupt source;
- receiving a second interrupt from a second interrupt source;
- servicing the first interrupt;
- storing data used to service the first interrupt within a first shadow set;
- receiving a designation of a shadow set to service the second interrupt; and
- determining, based on a dedicated bit, whether the shadow set to service the second interrupt is said first shadow set.

19. A method in accordance with claim 18, further comprising:
- determining that the shadow set to service the second interrupt is said first shadow set in response to determining that the dedicated bit has a first value;
- determining that the shadow set to service the second interrupt is not said first shadow set in response to determining that the dedicated bit has a second value other than the first value.

20. A method in accordance with claim 18, further comprising:
- determining whether the second interrupt has a higher priority than the first interrupt;
- determining to save data from the first shadow set into a main memory upon determining that the second interrupt has the higher priority and that the dedicated bit has the first value.

21. A method in accordance with claim 18, wherein the dedicated bit includes only a single bit.

22. A method in accordance with claim 20, further comprising determining to save data used to service the first interrupt in the main memory without a need to execute a branch instruction and without a need to analyze data stored within a normal set or the shadow sets.

23. A method in accordance with claim 22, further comprising:
- comparing a second index with a first index of a status register;
- determining that the dedicated bit has the first value upon determining that the first index is equal to the second index,
- determining that the dedicated bit has the second value upon determining that the first index is not equal to the second index.

* * * * *